May 4, 1943.　　　　P. B. STREICH　　　　2,318,538
VARIABLE POWER TRANSMISSION MECHANISM
Filed March 28, 1942　　　　2 Sheets-Sheet 1

Inventor:
Paul B. Streich,
By Banning & Banning
Attorneys.

May 4, 1943.  P. B. STREICH  2,318,538
VARIABLE POWER TRANSMISSION MECHANISM
Filed March 28, 1942  2 Sheets-Sheet 2
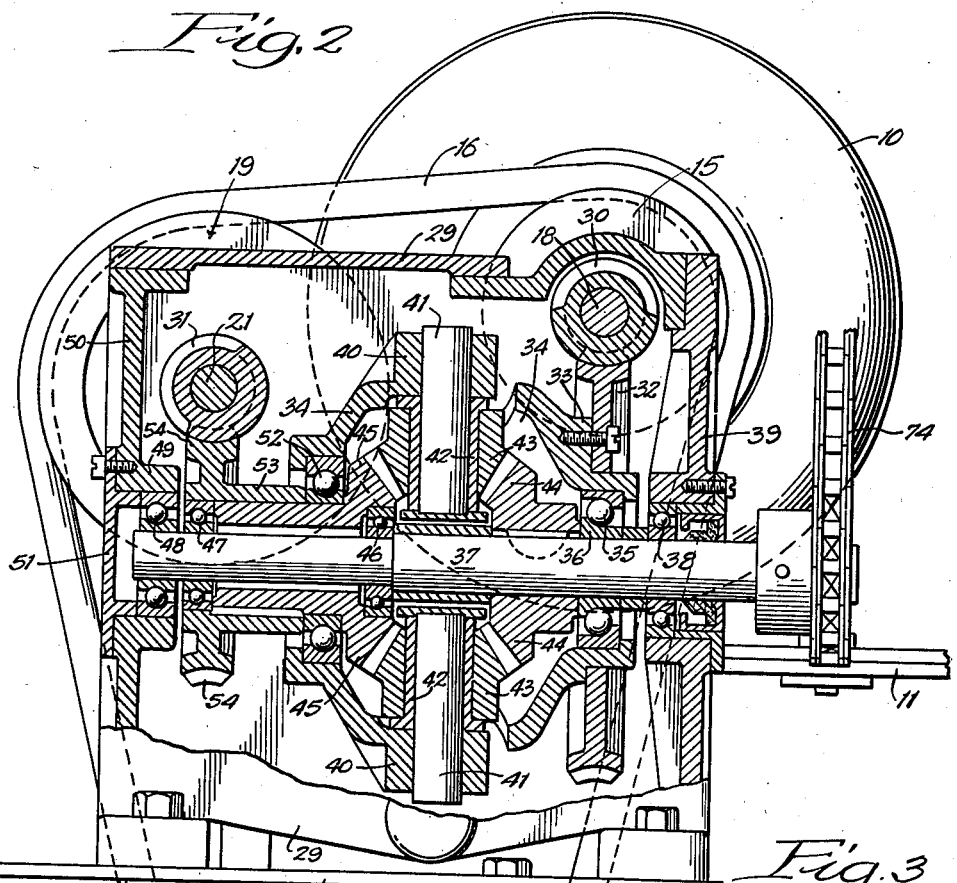
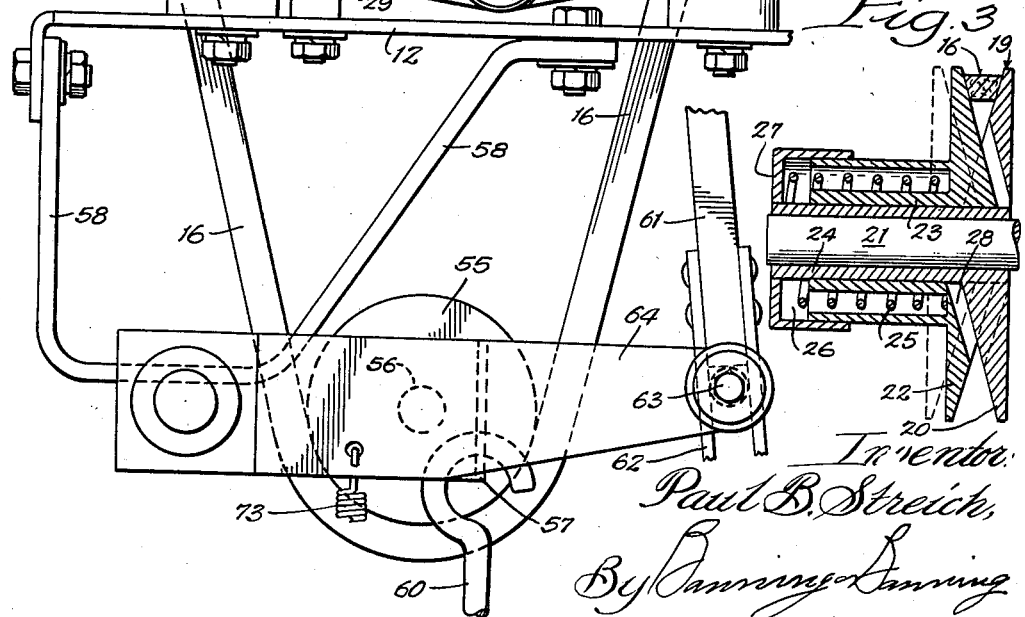
Inventor
Paul B. Streich,
By Banning & Banning
Attorneys.

Patented May 4, 1943

2,318,538

UNITED STATES PATENT OFFICE 2,318,538

VARIABLE POWER TRANSMISSION MECHANISM

Paul B. Streich, Maywood, Ill., assignor to Charles Bruning Co., Inc., Chicago, Ill., a corporation of Illinois Application March 28, 1942, Serial No. 436,706

10 Claims. (Cl. 74—286)

The power transmission mechanism of the present invention is designed as a variation and improvement upon the device set forth and described in United States Patent Number 2,291,928, issued August 4, 1942.

The present invention is designed to permit variations in speed of power transmission throughout a wide range and by the employment of a self-contained group of mechanisms which may be easily and accurately applied to mechanism or equipment requiring variation in speed of operation.

The present invention, like the one described in the application referred to, employs a differential train of gearing including what may be properly referred to as primary and secondary shafts, but in the aforesaid application both of these shafts were rotated by a belt driven by a motor which is mounted upon an adjustable platform to permit the adjustments required in varying the speed ratio.

In the case of the present invention, the motor is fixedly positioned with relation to the gear housing and directly drives the primary shaft, and the speed changes are effected by the adjustment of an idler pulley, which arrangement results in greater compactness and in permitting the weight of the motor to be sustained by the fixed frame of the machine, and also greatly relieves the belt from strain, and in general improves the construction and group arrangement of the operating parts.

The device of the present invention has been designed primarily for use in the driving of the feed mechanisms employed in the feeding of sheets of sensitized paper through a photo-printing machine in which a wide range in the period of exposure is desirable, although the variable speed mechanism is equally adapted for use in connection with other types of machines or appliances.

Other objects and details will appear from the description of the invention in conjunction with the accompanying drawings, wherein—

Fig. 2 is an enlarged view partly in section taken on line 2—2 of Fig. 1, looking in the direction of the arrows; and Fig. 3 is a longitudinal sectional detail of the variable speed drive pulley.

Figure 1:
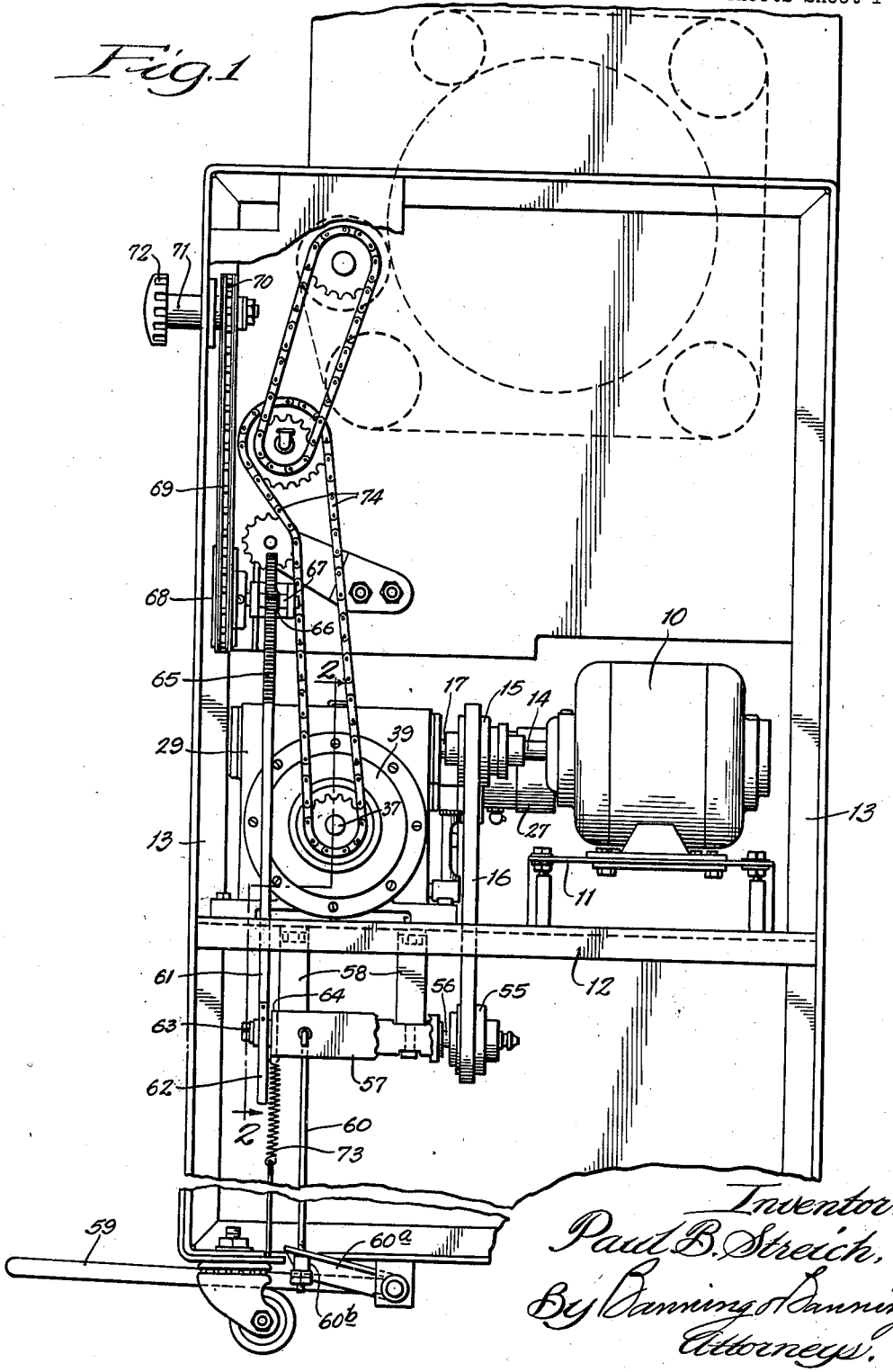
Figure 1 is a side elevation of the variable speed mechanism of the present invention associated with a photo-printing machine.

The variable speed assembly comprises a motor 10 which is supported upon a fixed platform 11 carried by a cross frame 12 the ends of which are supported by uprights 13—13 constituting a portion of the main frame of the machine or appliance with which the present mechanism is associated. The motor 10 is provided with a motor shaft 14 carrying a smooth faced pulley 15, over which passes a belt 16 wedge shaped in cross section.

The motor shaft 14 is exactly aligned and coupled with an extension 17 from a primary worm shaft 18 presently to be described in detail thereby providing a rigidly entrained driving relation between the parts as distinguished from a flexible belt drive although it will be understood that the term "rigidly entrained" is not intended to limit the construction to the axial alignment of the parts as shown. The belt 16 then passes around a grooved adjustable pulley 19 which comprises a fixed section 20 keyed upon a secondary worm shaft 21 and a movable section 22 provided with a hub 23 which is slidably mounted upon the hub 24 of the fixed pulley section. The movable section is backed by a spring 25 which is housed within an annular recess 26 and bears against a cap 27 on the end of the hub of the fixed pulley section.

The fixed and movable pulley sections have oppositely disposed bevel faces which are reciprocally notched as at 28 to afford an interlocking fit with one another, which maintains the interlocking relation despite variations in the spread between the pulley sections occasioned by the drawing in of the wedge shaped belt 16, which may be positioned as shown in full lines in Fig. 3, or drawn inwardly into comparatively closed relationship to the interfitting heads of the fixed and movable sections, or adjusted to positions more nearly adjacent the periphery of the divided pulley. A pulley of this character is standard, and no claim is made for this device per se.

The primary and secondary worm shafts 18 and 21 are journalled through the side walls of a casing 29 which houses a differential mechanism now to be described. The primary shaft 18 carries a worm 30, and the secondary shaft 21 carries a worm 31. The worm 30 meshes with a ring-shaped gear 32 which is mounted upon the face of the shouldered hub 33 of a cage 34. The hub is mounted upon ball bearings 35 carried within a race 36 mounted upon a driven shaft 37 journalled within ball bearings 38 mounted within a closing plate 39 constituting one of the end walls of the casing.

The periphery 40 of the cage 34 affords a mounting for a pair of inwardly projecting oppositely disposed stub shafts 41 each surrounded by a bushing 42 which affords a bearing for a beveled pinion 43. The two beveled pinions 43, which may be termed the revolving pinions, mesh on one side with a driven beveled pinion 44 keyed to the shaft 37, and on the other side mesh with a transmission beveled pinion 45 the hub of which is journalled upon inner ball bearings 46 and outer ball bearings 47 carried by the reduced end of the shaft 37, which is journalled at its terminus within ball bearings 48 mounted within a boss 49 in the end wall 50 of the casing and held in place by a cap 51. The adjacent portion of the cage 34 is mounted upon ball bearings 52 which are carried by the hub of the transmission pinion 45, which also has keyed thereon a hub 53 of a transmission worm gear 54 meshing with the worm 31.

The arrangement is such that the cage 34 with the revolving pinions 43 will be driven at a constant speed by the primary worm shaft 18, which is directly aligned and connected with the motor shaft and through the worm 30 and worm gear 32, and in the absence of resistance the revolving pinions will mesh freely with the teeth of the keyed driven pinion 44 without imparting rotation to the driven shaft 37. The speed and direction of rotation imparted to the driven shaft, therefore, will depend upon the speed of rotation imparted to the transmission pinion 45 through the variable speed drive afforded by the divided grooved pulley.

Thus, with the transmission pinion 45 rotating in the same direction as the rotation of the cage carrying the revolving pinions and at a rate of peripheral speed equal to the peripheral speed of the revolving pinions, the latter will be permitted to rotate freely upon their respective shafts during their orbital travel upon the face of the driven shaft 44, so that no resistance will be afforded to impart rotation to the driven shaft 37, which in these conditions will stand stationary. If, however, the speed of rotation of the pinion 45, in the same direction as the cage, exceeds the speed of rotation imparted to the revolving orbital pinions by rotation of the cage, a thrust will be established which imparts an opposite rotation to the driven shaft 37. In like manner, when the speed of rotation of the transmission pinion 45 is less than the neutral rotation of the orbital pinions, the same direction of rotation will be imparted to the shaft 37 at the desired speed ratio.

As shown in Fig. 3, the belt 16 occupies an intermediate position within the divided pulley, which represents the neutral or idle condition within which the rotation imparted to the transmission pinion 45 is equal to and in the same direction as the rotation of the orbital pinions imparted by the cage 34. By drawing in the belt 16 toward the axis of the shaft 21, the speed of rotation of the pinion 45 is rapidly increased, with resultant opposite rotation of the driven shaft, so that in practical operation it is easily possible, by selection of appropriate gears, to impart to the driven shaft variations in speed of unlimited ratio, and also, by allowing the belt 16 to move outwardly beyond the intermediate position, it is possible to provide variable rotation to the driven shaft in the same direction as the pinion 45.

The special features of the present invention which more particularly distinguish it from the one disclosed in the patent application referred to will now be described:

The belt 16 is carried down and around an adjusting idler pulley, which is mounted upon the projecting end of a pintle 56 carried by an open rectangular yoke frame 57 which is pivotally supported at a distance from the axis of the pulley 55 from the spaced hanger brackets 58, which suspend the yoke and the roller carried thereby from the cross frame or platform 12 and permit the pulley 55 to be adjusted vertically to impart the desired adjustment to the belt 16, which when drawn inwardly serves to spread the divided pulley against the tension of the spring 25.

The adjustments may be effected either through the depression of a foot treadle 59 conveniently pivoted near the base of the machine, which imparts a pull through a draw rod 60 connected with an arm 60a carried by the pivotal mounting for the foot treadle with which the draw rod is adjustably connected and locked by nuts 60b; or alternately the adjustments may be effected by the thrust of a hand operated adjusting rod 61, which is bifurcated at its lower end 62 to straddle a pintle or roller 63 carried by an arm 64 projecting outwardly from the hingedly mounted yoke.

The upper end of the thrust rod 61 is provided with rack teeth 65 which mesh with a pinion 66 mounted upon a shaft 67 carrying a sprocket wheel 68 and a sprocket chain 69 leads to an upper sprocket wheel 70 on a shaft 71 terminating in an adjusting knob 72 conveniently located at a high level within reach of the operator.

In order to assist the operator in depressing the foot treadle and in drawing down the belt 16 against the tension of a spring in the divided pulley, a coil spring 73 is provided, which engages the yoke at its upper end and is suitably secured to the base portion of the frame at its lower end.

Power is transmitted from the shaft 37 through the medium of a sprocket and chain transmission 74, or through transmission elements of any suitable character.

*Operation*

With the belt occupying the intermediate or neutral position shown in Fig. 3, and with the motor running, the transmission gearing will rotate idly without the transmission of power. The desired forward or reverse rotations of the shaft 37 at the desired speed may be effected by the depression of the foot treadle, or by the operation of the hand adjusting knob 72, which may be rotated to the desired degree to limit the upward movement of the hinged yoke when pressure upon the foot treadle is released. The hand adjustment may thus be set to permit restoration of the belt to the neutral position when the treadle is released, or may if desired be employed to impart a downward thrust beyond the neutral position to effect a close and accurate adjustment of the forward feeding speed, or if desired may be retracted beyond the neutral position to permit reverse rotation at the desired speed ratio.

Under ordinary operating conditions, the hand adjustment may be set to act as a stop for limiting the upward adjustment of the yoke at the neutral point, which permits the desired forward speed to be obtained by the depression of the foot treadle to the limit of its movement. Where reverse feeding may be momentarily required, as in cases of emergency or otherwise, the hand knob can be adjusted to draw the thrust rod 61 upwardly beyond the neutral position, so that a release of the foot treadle will effect a reverse feeding for the desired period.

By directly and independently driving the primary shaft 18 from the motor through an inflexible entrainment of the parts rather than through the belt, the burden on the belt is greatly reduced, and at the same time the compact and self-contained arrangement of the parts is effected and the weight of the motor is carried by the rigid and rugged frame construction which also supports the gearing. It thus becomes unnecessary to impart adjusting movements to the motor itself, thus greatly reducing the weight of the parts requiring adjustment as compared with the construction set forth in the patent application previously referred to.

Although the differential gearing has been described in full detail, it will be understood that it is not the intention to limit the invention to gearing of the precise character shown, which serves merely for purposes of illustration. Likewise, the adjusting features of the present invention may be modified or altered within the limits of the appended claims, without departing from the spirit of the invention.

I claim:

1. In variable speed transmission mechanism, the combination of a primary shaft, a secondary shaft and a driven shaft, variable speed transmission gearing in train between the primary and secondary shafts and the driven shaft for imparting variable speeds to the driven shaft, a motor having a fixed position with respect to the primary shaft and rigidly entrained therewith for driving at a constant speed, the secondary shaft being provided with a spring backed divided pulley, a pulley rigidly entrained with the primary shaft and driven at constant speed by the motor shaft, an idler pulley and an adjustable mounting therefor, a belt carried around the motor driven pulley, the divided pulley and the idler pulley, and means for adjusting the position of the idler pulley mounting to effect variations in the position of the belt with respect to the axis of the divided pulley for imparting variable speeds to the driven shaft.

2. In variable speed transmission mechanism, the combination of a primary shaft, a secondary shaft and a driven shaft, variable speed transmission gearing in train between the primary and secondary shafts and the driven shaft for imparting variable speeds to the driven shaft, a motor having a fixed position with respect to the primary shaft and having the motor shaft aligned and rigidly coupled with the primary shaft and having driving connection therewith at a constant speed, the secondary shaft being provided with a spring backed divided pulley, a pulley having coaxial relation with the motor shaft and rigidly entrained therewith and driven at constant speed by the motor shaft, an idler pulley and an adjustable mounting therefor, a belt carried around the motor driven pulley, the divided pulley and the idler pulley, and means for adjusting the position of the idler pulley mounting to effect variations in the position of the belt with respect to the axis of the divided pulley for imparting variable speeds to the driven shaft.

3. In variable speed transmission mechanism, the combination of a primary shaft, a secondary shaft and a driven shaft, variable speed transmission gearing in train between the primary and secondary shafts and the driven shaft for imparting variable speeds to the driven shaft, a motor having a fixed position with respect to the primary shaft and having driving connection therewith at a constant speed, the secondary shaft being provided with a spring backed divided pulley, a pulley driven at constant speed by the motor shaft, an idler pulley and an adjustable mounting therefor, a belt carried around the motor driven pulley, the divided pulley and the idler pulley, and means for adjusting the position of the idler pulley mounting to effect variations in the position of the belt with respect to the axis of the divided pulley for imparting variable speeds to the driven shaft, said adjusting means including a foot treadle and a connection between the foot treadle and the adjustable mounting and also including a manually adjustable member positioned to limit the return movement of the adjustable mounting upon release of the foot treadle and also adapted to impart variable adjustments to the mounting irrespective of the operation of the foot treadle.

4. In variable speed transmission mechanism, the combination of a primary shaft, a secondary shaft and a driven shaft, variable speed transmission gearing in train between the primary and secondary shafts and the driven shaft for imparting variable speeds to the driven shaft, a motor having a fixed position with respect to the primary shaft and having the motor shaft aligned and coupled with the primary shaft and having driving connection therewith at a constant speed, the secondary shaft being provided with a spring backed divided pulley, a pulley having coaxial relation with the motor shaft and driven at constant speed by the motor shaft, an idler pulley and an adjustable mounting therefor, a belt carried around the motor driven pulley, the divided pulley and the idler pulley, and means for adjusting the position of the idler pulley mounting to effect variations in the position of the belt with respect to the axis of the divided pulley for imparting variable speeds to the driven shaft, said adjusting means including a foot treadle and a connection between the foot treadle and the adjustable mounting and also including a manually adjustable member positioned to limit the return movement of the adjustable mounting upon release of the foot treadle and also adapted to impart variable adjustments to the mounting irrespective of the operation of the foot treadle.

5. In variable speed transmission mechanism, the combination of a primary shaft, a secondary shaft and a driven shaft, variable speed transmission gearing in train between the primary and secondary shafts and the driven shaft for imparting variable speeds to the driven shaft, a gear housing for enclosing the shafts and gearing, a rigid mounting for the gear housing, a motor carried by said mounting and having its shaft aligned and coupled with the primary shaft, a pulley carried by the coupled shafting in axial coincidence therewith, a spring backed divided pulley carried by the secondary shaft, a hingedly mounted adjustable yoke carried by the mounting for the motor and gear housing, an idler pulley journalled upon said yoke at a point distant from its hinge mounting, a belt carried around the idler pulley, the divided pulley and the motor shaft-driven pulley, and means for oscillating the hinged yoke to variably adjust the belt with relation to the axis of the divided pulley.

6. In variable speed transmission mechanism, the combination of a primary shaft, a secondary shaft and a driven shaft, variable speed transmission gearing in train between the primary and secondary shafts and the driven shaft for imparting variable speeds to the driven shaft, a gear housing for enclosing the shafts and gearing, a rigid mounting for the gear housing, a motor carried by said mounting and having its shaft aligned and coupled with the primary shaft, a pulley carried by the coupled shafting in axial coincidence therewith, a spring backed divided pulley carried by the secondary shaft, a hingedly mounted adjustable yoke carried by the mounting for the motor and gear housing, an idler pulley journalled upon said yoke at a point distant from its hinge mounting, a belt carried around the idler pulley, the divided pulley and the motor shaft-driven pulley, and means for oscillating the hinged yoke to variably adjust the belt with relation to the axis of the divided pulley, said oscillating means including a foot treadle and a connection therefrom to the hingedly mounted yoke and also including a hand operated thrust rod for adjustably limiting the return movements of the yoke upon release of the foot treadle and for imparting adjustments to the yoke independently of the foot treadle.

7. In variable speed transmission mechanism, the combination of a primary shaft and a secondary shaft each provided with a worm, a worm gear meshing with the primary worm and a cage carried by said worm gear, orbital gears rotatably mounted within the cage and revolving therewith, a driven shaft in train with said orbital gears, transmission gear means in train with the secondary worm and with the orbital gears, means for imparting variable speeds of rotation to the secondary shaft and the gear means in train therewith, said means including a spring backed divided pulley and a belt adapted to be variably adjusted with relation to the axis of the pulley, a motor fixedly positioned with relation to the primary shaft and rigidly entrained therewith for imparting uniform rotation from the motor shaft to the primary shaft a motor driven pulley rigidly entrained with the motor shaft and the primary shaft, an idler pulley and an adjustable mounting therefor, a belt carried around the idler pulley and around the motor driven pulley and the divided pulley, and means for adjusting the position of the idler pulley mounting to vary the relation of the belt with respect to the axis of the divided pulley.

8. In variable speed transmission mechanism, the combination of a primary shaft and a secondary shaft each provided with a worm, a worm gear meshing with the primary worm and a cage carried by said worm gear, orbital gears rotatably mounted within the cage and revolving therewith, a driven shaft in train with said orbital gears, transmission gear means in train with the secondary worm and with the orbital gears, means for imparting variable speeds of rotation to the secondary shaft and the gear means in train therewith, said means including a spring backed divided pulley and a belt adapted to be variably adjusted with relation to the axis of the pulley, a motor fixedly positioned with relation to the primary shaft and imparting uniform rotation from the motor shaft to the primary shaft, an idler pulley and an adjustable mounting therefor, a belt carried around the idler pulley and around the motor driven pulley and the divided pulley, and means for adjusting the position of the idler pulley mounting to vary the relation of the belt with respect to the axis of the divided pulley, said means including a foot treadle and a connection therefrom to the adjustable mounting and also including a hand operated thrust rod positioned to limit the return movement of the adjustable mounting when the foot treadle is released and also to permit manual adjustments of the mounting independently of the foot treadle.

9. In variable speed transmission mechanism, the combination of a primary shaft and a secondary shaft each provided with a worm, a worm gear meshing with the primary worm and a cage carried by said worm gear, orbital gears rotatably mounted within the cage and revolving therewith, a driven shaft in train with said orbital gears, transmission gear means in train with the secondary worm and with the orbital gears, means for imparting variable speeds of rotation to the secondary shaft and the gear means in train therewith, said means including a spring backed divided pulley and a belt adapted to be variably adjusted with relation to the axis of the pulley, a motor fixedly positioned with relation to the primary shaft and rigidly entrained therewith for imparting uniform rotation from the motor shaft to the primary shaft a motor driven pulley rigidly entrained with the motor shaft and the primary shaft, an idler pulley and a hinged adjustable mounting therefor, a belt carried around the idler pulley and around the motor driven pulley and the divided pulley, and means for adjusting the position of the hinged idler pulley mounting to vary the relation of the belt with respect to the axis of the divided pulley.

10. In variable speed transmission mechanism, the combination of a primary shaft and a secondary shaft each provided with a worm, a worm gear meshing with the primary worm and a cage carried by said worm gear, orbital gears rotatably mounted within the cage and revolving therewith, a driven shaft in train with said orbital gears, transmission gear means in train with the secondary worm and with the orbital gears, means for imparting variable speeds of rotation to the secondary shaft and the gear means in train therewith, said means including a spring backed divided pulley and a belt adapted to be variably adjusted with relation to the axis of the pulley, a motor fixedly positioned with relation to the primary shaft and imparting uniform rotation from the motor shaft to the primary shaft, an idler pulley and a hinged adjustable mounting therefor, a belt carried around the idler pulley and around the motor driven pulley and the divided pulley, and means for adjusting the position of the hinged idler pulley mounting to vary the relation of the belt with respect to the axis of the divided pulley, said means including a foot treadle and a connection therefrom to the adjustable mounting and also including a hand operated thrust rod positioned to limit the return movement of the adjustable mounting when the foot treadle is released and also to permit manual adjustments of the mounting independently of the foot treadle.

PAUL B. STREICH.